United States Patent [19]

Kinzenbaw

[11] Patent Number: 4,986,367
[45] Date of Patent: Jan. 22, 1991

[54] FOLDING ROW MARKER

[75] Inventor: Jon E. Kinzenbaw, Williamsburg, Iowa

[73] Assignee: Kinze Manufacturing, Inc., Williamsburg, Iowa

[21] Appl. No.: 445,048

[22] Filed: Dec. 4, 1989

[51] Int. Cl.$^5$ .............................................. A01B 69/02
[52] U.S. Cl. ..................................... 172/126; 172/456
[58] Field of Search .............................. 172/126–132, 172/456, 311

[56] References Cited

U.S. PATENT DOCUMENTS

| | | | |
|---|---|---|---|
| 3,072,200 | 1/1963 | Yerkes | 172/126 |
| 3,201,821 | 8/1965 | Ruckstuhl | 16/163 |
| 3,520,373 | 7/1970 | Stinemetz | 172/130 |
| 3,548,954 | 12/1970 | Lindemann | 172/311 |
| 3,666,019 | 5/1972 | Yeske | 172/130 |
| 3,669,195 | 6/1972 | Green et al. | 172/311 |
| 3,747,148 | 7/1973 | Hitchcock | 74/101 |
| 3,766,987 | 10/1973 | Orthman | 172/126 |
| 3,799,272 | 3/1974 | Watson | 172/126 |
| 4,147,305 | 4/1979 | Hunt | 239/167 |
| 4,172,537 | 10/1979 | Gandrud et al. | 222/135 |
| 4,207,950 | 6/1980 | Kinzenbaw | 172/126 |
| 4,449,590 | 5/1984 | Williamson | 172/126 |
| 4,453,601 | 6/1984 | Orthman et al. | 172/311 |
| 4,467,872 | 8/1984 | Hodapp | 172/126 |
| 4,526,235 | 7/1985 | Kinzenbaw | 172/126 |
| 4,615,397 | 10/1986 | Hastings | 172/311 X |
| 4,632,417 | 12/1986 | Hodapp | 172/311 X |

OTHER PUBLICATIONS

Brochure re 30' Pulvi-Mulcher from Brillion Iron Works, Brillion, Wis.
Yetter 6000 Series planters brochure from Yetter Manufacturing Co., Inc., Colchester, Ill.

Primary Examiner—Randolph A. Reese
Assistant Examiner—Jeffrey L. Thompson
Attorney, Agent, or Firm—Emrich & Dithmar

[57] ABSTRACT

A folding row marker includes first, inner and second, intermediate sections pivotally coupled together, as well as a third, outer section pivotally coupled to a distal end of the second section. A marker disc is disposed on the distal end of the third section and a hydraulic ram pivotally displaces the second section relative to the first section and further, via connecting linkage, pivotally displaces the third section relative to the second section during extension of the row marker to the use position and retraction of the row marker to the stored position. The first section is adapted for pivoting attachment to an end of a folding toolbar and linkage is provided to maintain all sections of the row marker under application of a positive force in a fixed, fully folded, compact and stable configuration when the toolbar is in the stored position.

16 Claims, 2 Drawing Sheets

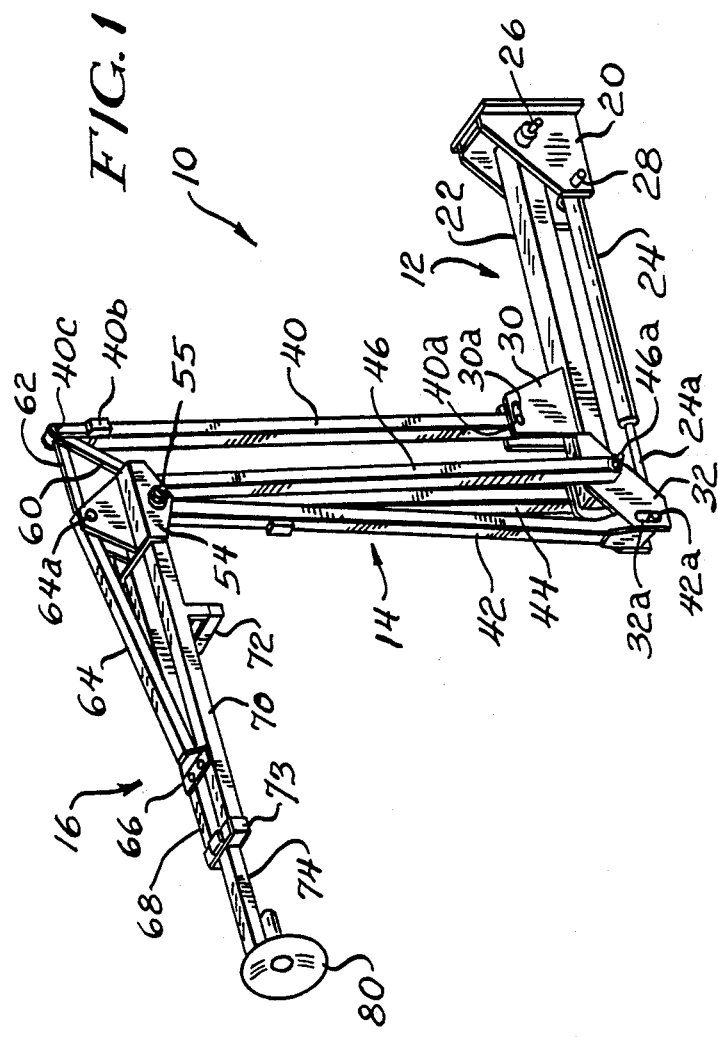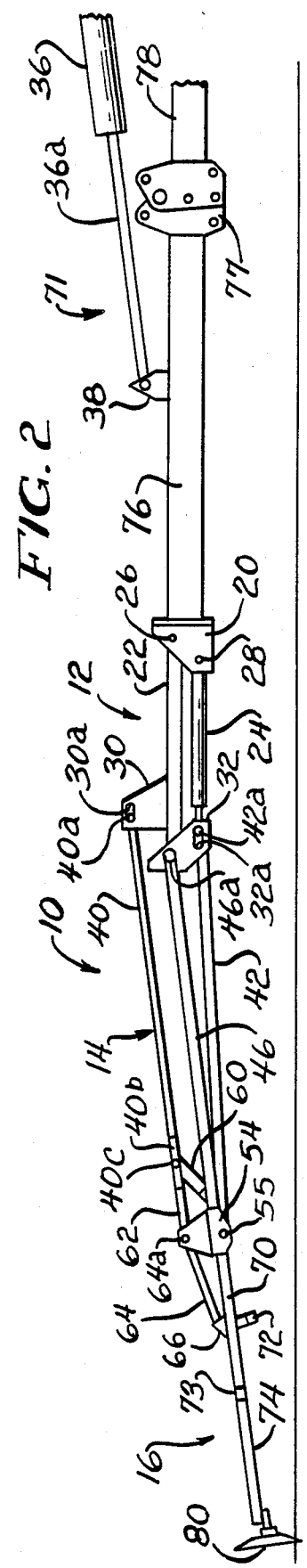

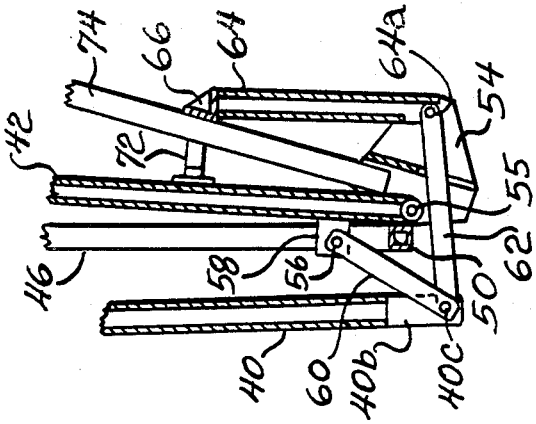
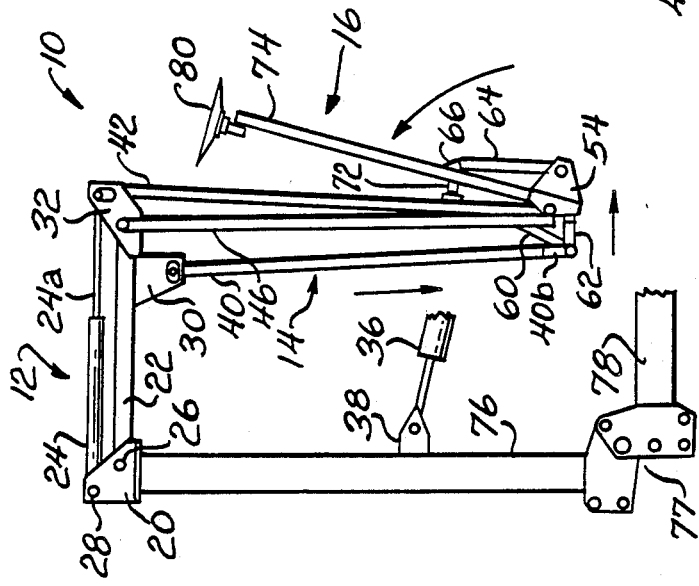
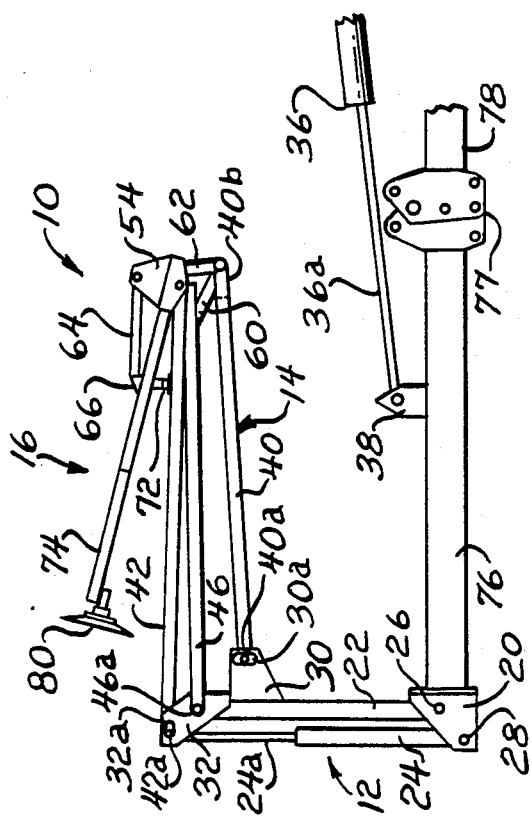
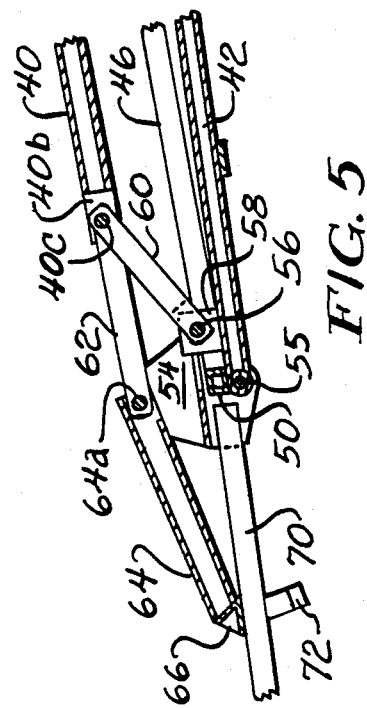
FIG. 6
FIG. 4
FIG. 3
FIG. 5

FOLDING ROW MARKER

BACKGROUND OF THE INVENTION

This invention relates generally to apparatus for marking the lateral limit of an agricultural implement to indicate to a farmer where to position his tractor and is particularly directed to a folding row marker for use during planting.

Multi-section toolbars for use in agricultural applications generally include first and second wings pivotally mounted to a main, or center, frame. The wings or "bars" are pivotable between a use position in which the wings are oriented generally horizontally and extend laterally with respect to the main frame and transverse to the direction of travel of the vehicle which draws the toolbar, and a transport or storage position in which the wings extend either rearwardly of the main frame and parallel to the direction of travel of the vehicle or are folded upward so that the width of the entire retracted mechanism is no longer than the length of the main frame. Each of the toolbar wings is typically coupled to the main frame of the toolbar by means of a hinge mechanism which is aligned either vertically or horizontally to allow the wing to pivot in either one or the other of these directions. The present invention is intended for use with a multi-section toolbar in which the wings pivot vertically between the use and non-use positions.

During planting, a plurality of planter units are attached in a spaced manner to the toolbar along the length thereof. Recent trends in planter design and operation are toward the use of larger planters, with the planter frame extending as much as 80 feet in length in some cases. When making a pass with a planter of this length, the outermost planter units are spaced approximately 40 feet from the centerline of the tractor. Markers typically in the form of a disc are used as an aid to the farmer for proper positioning of his tractor. Regardless of the distances involved, the marker which establishes the position of the outermost row should have a length, in the use position, equal to one-half of the width of the planter frame when it is extended, i.e., the distance from the center line of the tractor to the outermost planting unit.

In the past, most row markers have included either a single arm pivotally coupled to an end of a planter frame or two arms pivotally joined together and having a marker element on the outboard end of one of the arms, with the inboard end of the other arm pivotally connected to the end of the planter frame. With the increasing size of planter systems, the tendency today is toward the use three-section row marker units to accommodate the larger planter systems. Examples of two-section row markers can be found in U.S. Pat. Nos. 3,766,987 to Orthman; 3,666,019 to Yeske; and 4,526,235 to Kinzenbaw.

Three-section, row marker systems provide the obvious advantage of increased field coverage over that of two-section row markers. Folding row markers also permit the marker arms to be folded in a more compact configuration thus limiting the height of the folded planter frame to facilitate non-use transport and reduce row marker storage space. An example of a folding row marker arrangement can be found in U.S. Pat. No. 4,207,950, also to Kinzenbaw. In general, prior art folding row marker arrangements are maintained in the retracted position by gravity. This does not generally result in the most compact storage configuration, nor are the various sections securely maintained in position by means of an applied force during transport.

The present invention is directed to a folding row marker for use with either a folding or a fixed toolbar in which a positive force is applied to the row marker when in the folded, non-use position for more secure and stable transport and storage of the toolbar and row marker combination.

OBJECTS AND SUMMARY OF THE INVENTION

Accordingly, it is an object of the present invention to provide an improved folding arrangement for a multi-section row marker as used in agricultural applications such as during planting.

Another object of the present invention is to provide a folding row marker for use with either a folding or a fixed toolbar which assumes a stable, compact and secure configuration when folded.

Yet another object of the present invention is to provide a folding row marker particularly adapted for use with a folding toolbar which permits the combination to be compactly folded and to be securely maintained in a folded configuration under tension when not in use such as when stored or during transport.

The foregoing features of the present invention are achieved by means of a folding row marker for use with a toolbar, the folding row marker comprising a first, inner section pivotally coupled to an end of a toolbar member; a second, intermediate section pivotally coupled to a distal end of the first section; a third, outer section having a proximal end pivotally coupled to the second section and a distal end having a marker element disposed thereon; displacement mean coupled to the first and second sections for pivotally displacing in a generally vertical direction the first section relative to the toolbar member and the second section relative to the first section in folding and unfolding the row marker between non-use and use positions; and control means coupled to the first and third sections for extending the third section from the second section in a generally horizontal orientation when in the use position and for maintaining the third section under an applied force in closely spaced, fixed relation with respect to the second section when in the non-use position.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is a perspective view of a folding row marker in accordance with the principles of the present invention shown in a position intermediate the fully folded and fully extended positions;

FIG. 2 is a front plan view of the folding row marker of the present invention shown in the fully extended position;

FIG. 3 is a plan view of the folding row marker of the present invention shown in a fully folded configuration;

FIG. 4 is a plan view of the folding row marker of the present invention shown in the fully folded configuration with a toolbar to which the row marker is coupled also shown in a folded position;

FIG. 5 illustrates details of a folding hinge arrangement of the folding row marker of the present invention in the extended position; and FIG. 6 illustrates details of the folding hinge arrangement of FIG. 5 in the fully folded position.

DESCRIPTION OF THE PREFERRED EMBODIMENT

Referring to FIGS. 1-4, a folding row marker 10 in accordance with the principles of the present invention will now be described. FIG. 1 is a perspective view showing the folding row marker 10 in a partially folded position. FIG. 2 shows the folding row marker 10 in the fully extended position, while the row marker is shown in the full retracted position in FIG. 4. FIG. 3 shows the folding row marker 10 in a partially retracted position intermediate the partially folded arrangement of FIG. 1 and the fully retracted position of FIG. 4.

The folding row marker 10 is adapted for coupling to a multi-section, folding toolbar 71 by means of a mount 20. The toolbar 71 typically includes first and second toolbar sections 76, 78 coupled together via a pivot bracket 77. Also included in the toolbar assembly is a hydraulic ram 36 which is coupled via a mounting bracket 38 to the first toolbar section 76. With the butt end of the hydraulic ram 36 coupled to either the second toolbar section 78 or another fixed portion of the toolbar and its rod end attached to the first toolbar section 76 via the mounting bracket 38, the first toolbar section may be displaced upward or downward in a pivoting manner about the pivot bracket 77. Thus, with the rod end of the hydraulic ram 36 fully extended, the folding row marker 10 assumes the extended, or use, position of FIG. 2. Similarly, with the rod end of the hydraulic ram 36 fully retracted and the first toolbar section 76 folded upward, the folding row marker 10 assumes the non-use, or stored, position shown in FIG. 4. While the toolbar 71 is described herein as being foldable, the folding row marker 10 of the present invention is not limited to use with a folding toolbar, but will operate equally as well with a fixed, nonfolding type of toolbar. When used with a folding toolbar, the folding row marker 10 is of the three-point type and when used with a fixed, nonfolding toolbar the row marker is of the two-point type.

The folding row marker 10 includes a first inner section 12, a second intermediate section 14, and a third outer, or end, section 16. A proximal end of the first inner section 12 is coupled to a distal end of the first toolbar section 76 by means of a mount assembly 20. The mount assembly 20 includes a plurality of metal plates securely coupled together and attached to the distal end of the first toolbar section 76 by conventional means such as weldments. The butt end of another hydraulic ram 24 is pivotally attached to the mount assembly 20 by means of a ram mounting pin 28. Similarly, the proximal end of an inner link 22 is also coupled to the mount assembly 20 by means of a pivot pin 26. The distal end of the inner link 22 is coupled to an inner mounting bracket 32 by means of a pivot pin 46a which also couples proximal ends of a pair of intermediate section arms 44 and 46 to the inner mounting bracket. The rod end of the hydraulic ram 24 is coupled by means of a pivot pin 42a to the inner mounting bracket 32, while this same pivot pin couples a proximal end of an intermediate section pivot bar 42 to the inner mounting bracket. The inner mounting bracket 32 includes an elongated slot 32a within which the pivot pin 42a is positioned. Pivot pin 42a is movable within the inner mounting brackets slot 32a in a sliding manner which allows for limited vertical displacement of the first and second sections 12, 14 when the folding row marker 10 is in the extended use position of FIG. 2. This permits a row marker disc 80 to follow the ground contour as the toolbar and row marker combination is moved during operation.

The second intermediate section 14 of the folding row marker 10 includes the first and second intermediate section arms 44 and 46 and the intermediate section pivot bar 42. As indicated above, the proximal ends of each of the first and second intermediate section arms 44, 46 are pivotally coupled via pivot pin 46a to the inner mounting bracket 32. Similarly, the distal ends of each of the first and second intermediate section arms 44, 46 are pivotally coupled to an outer mounting bracket 54 as described in detail below. The distal end of the intermediate section pivot bar 42 is also coupled to the outer mounting bracket 54 by means of a pivot pin 55.

A proximal end of a long control link 40 is coupled via a pivot pin 40a to mounting bracket 30 fixedly attached to the inner link 22. The mounting bracket 30 includes an elongated slot 30a within which the pivot pin 40a is positioned in a freely sliding manner. Linear displacement of the pivot pin 40a within the slot 30a allows for limited vertical displacement of the second and third sections 14, 16 when extended permitting the marker disc 80 to follow the contour of the soil during operation. A distal end of the long control link 40 is coupled to respective first ends of an idler link 60 and a short control link 62 by means of the combination of an end bracket 40b and a pivot pin 40c. Second ends of each of the idler link 60 and the short control link 62 are respectively coupled to the outer mounting bracket 54 and to the intermediate section arms 44 and 46 in a manner described in detail below. The long and short control links 40 and 62 undergo both compression and tension during extension and retraction of the folding row marker as described in the following paragraphs.

The outer mounting bracket 54 is further coupled in a fixed manner to respective proximal ends of first and second lower links 68 and 70 in the outer section 16. A proximal end of an upper link 64 in the third outer section 16 is coupled to an upper portion of the outer mounting bracket 54 by means of a pivot pin 64a, which also couples a distal end of the short control link 62 to the outer mounting bracket. The distal end of the upper link 64 is fixedly attached to respective adjacent upper portions of the first and second lower links 68, 70 of the outer section 16 by means of a mounting bracket 66. Coupled to respective lower portions of each of the first and second lower links 68, 70 is a stop 72, preferably comprised of a resilient material such as rubber. The stop 72 limits retraction of the third outer section 16 of the folding row marker 10 as described in detail below.

Attached to the first and second lower links 68, 70 of the third outer section 16 in a telescoping manner by means of an end bracket 73 is an extension tube 74. Disposed on the distal end of the extension tube 74 is a marker disc 80. The extension tube 74 is movable in a telescoping manner along the length of the first and second lower links 68, 70 and may be secured in position thereon by conventional means such as by mounting bolts through the end bracket 73 or mounting bracket 66.

With reference to the above-discussed figures as well as to the additional details shown in FIGS. 5 and 6, the operation of the folding row marker 10 of the present invention will now be described. In moving the row marker 10 from the extended, or use, position shown in FIG. 2 to the retracted, non-use, position shown in FIG. 4, the hydraulic ram 24 is extended causing the inner mounting bracket 32 to rotate in a clockwise direction as viewed in FIG. 2 about pivot pin 46a. Rotation of the inner mounting bracket 32, in turn, causes clockwise pivoting of the second section 14 to a generally vertical orientation as shown in FIG. 1. As the second intermediate section 14 is rotated upwardly, the intermediate section pivot bar 42 pivots about the second ram mounting pin 42a, while the intermediate section arms 44 and 46 pivot relative to the inner link 22 and inner mounting bracket 32 about pivot pin 46a. As the intermediate section pivot bar 42 and first and second intermediate section arms 44, 46 are pivotally displaced as just described, the long control link 40 is also pivotally displaced in a clockwise direction as viewed in FIG. 2 about pivot pin 40a disposed within slot 30a in mounting bracket 30. Mounting bracket 30 is fixedly coupled by conventional means such as weldments to an upper surface of the inner link 22.

The distal end of the intermediate section pivot bar 42 is coupled to the outer mounting bracket 54 via a pivot pin 55 as shown in the partial sectional views of FIGS. 5 and 6. Distal ends of the intermediate section arms 44 and 46 are coupled to the distal end of the intermediate section pivot bar 42 by means of a cross bar 50. The combination of intermediate section pivot bar 42 and intermediate section arms 44 and 46 is pivotally displaced about the outer mounting bracket 54 by means of pivot pin 55.

As the long control link 40 is pivotally displaced in a clockwise direction as viewed in FIG. 2, idler link 60 and short control link 62 are pivotally displaced in a counterclockwise direction about pivot pin 40c within the end bracket 40b on the long control link. As shown in detail in FIGS. 5 and 6, a distal end of the short control link 62 is coupled to the outer mounting bracket 54 by means of pivot pin 64a. The distal end of the idler link 60 is coupled to a sliding bracket 58 by means of a pivot pin 56. The sliding bracket 58 is disposed about the intermediate section arms 44 and 46 and movable along the respective lengths thereof. With the folding row marker in the extended position, the sliding bracket 58 is positioned adjacent to the distal ends of the intermediate section arms 44 and 46 as shown in FIG. 5. As the folding row marker is folded to the retracted, or non-use, position shown in FIG. 4, the sliding bracket 58 is displaced away from the distal ends of the intermediate section arms 44 and 46 as well as away from the cross bar 50 as shown in FIG. 6.

The first stage in retraction of the folding row marker 10 from the fully extended position of FIG. 2 is illustrated in FIG. 1. Extension of the cylinder rod 24a from the hydraulic ram 24 causes clockwise rotation of intermediate section pivot bar 42 and intermediate section arms 44 and 46 about the distal end of inner link 22. Long control link 40 is similarly displaced in a pivoting manner clockwise about mounting bracket 30. As the second intermediate section 14 is raised, the third outer section 16 pivots in a counter-clockwise direction about the distal end of the second section, engages the second intermediate section, and assumes a generally vertical orientation when the second section is vertical as shown in FIG. 1. Further pivoting displacement of the third outer section 16 is limited by engagement of a stop 72 on the third outer section with the intermediate section pivot bar 42. Pivoting displacement of the third outer section 16 relative to the second intermediate section 14 is about pivot pin 55 and is made possible by the combination of pivot pins 40c and 64a and idler link 60 and short control link 62. Idler link 60 maintains the relative positions of pivot pins 55, 64a and 40c during folding and unfolding of the second intermediate and third outer sections 14, 16. Idler link 60 also limits rotational displacement of the short control link 62 about pivot pin 40c. Re-positioning of the juncture of idler link 60, short control link 62 and long control link 40 beyond the distal end of second intermediate section 14 permits counter-clockwise rotation of the third outer section 16 about pivot pin 55.

Continued extension of cylinder rod 24a from the hydraulic ram 24 causes pivoting displacement of the inner link 22 about pivot pin 26 causing the inner link to assume a generally vertical orientation as shown in FIG. 3. In the fully folded configuration of the row marker 10 shown in FIG. 3, the second intermediate section 14 is oriented generally horizontal and at a 90° angle with respect to the first inner section 12. This 90° pivoting displacement of the first inner and second intermediate sections 12, 14 also causes pivoting displacement of the idler link 60 and short control link 62 as well as the long control link 40 with respect to the outer mounting bracket 54. Re-positioning of the aforementioned links relative to the outer mounting bracket 54 permits the outer mounting bracket as well as the lower links 68 and 70 and upper link 64 coupled thereto to pivot in a clockwise direction about the distal end of the second intermediate section 14. The extension tube 74 as well as the marker disc 80 attached thereto remain in the same position relative to the third outer section 16, with the stop 72 engaging the intermediate second pivot bar 42. With the stop 72 in contact with the intermediate section pivot bar 42, continued pivoting displacement of the third outer section 16 is prevented. With the cylinder rod 24a in an extended position, the first inner and second intermediate sections 12, 14 are maintained in a folded configuration under tension. Similarly, the third outer section 16 is maintained in a fixed folded position closely spaced from the second intermediate section 14 under tension by the extended cylinder rod 24a. The hydraulic ram 24 contemplated for use in the present invention is conventional in design and operation, with a source of hydraulic pressure (not shown in the figures for simplicity) coupled to the hydraulic ram for extending and retracting its cylinder rod 24a. Thus, in a preferred embodiment of the present invention, the hydraulic ram 24 is of the double-acting type. With the first, second and third sections 12, 14 and 16 in the fully folded configuration of FIG. 3, the row marker 10 is maintained folded under tension by means of the extended cylinder rod 24a. The row marker 10 is shown in the full folded configuration in FIG. 3 when used with a rigid, nonfolding toolbar, while the row marker and toolbar combination is shown in a partially folded configuration in FIG. 3 when the toolbar is of the folding type as described below.

Following full folding of the row marker 10 to the arrangement shown in FIG. 3, cylinder arm 36a is moved to the retracted position within hydraulic ram 36 causing clockwise rotation of the folding row marker 10 about pivot bracket 77. With the cylinder arm 36 fully retracted, the first toolbar section 76 and the second intermediate section 14 of the row marker are oriented generally vertically and the first inner section 12 of the row marker is oriented generally horizontally. The third outer section 16 of the toolbar is oriented at an acute angle relative to the second intermediate section 14 and is securely maintained in this position under the application of a positive force by the extended cylinder rod 24a. As in the case of hydraulic ram 24, hydraulic ram 36 is preferably of the double-acting type and is coupled to a conventional source of hydraulic pressure which is not shown in the figures for simplicity.

Unfolding of the row marker/toolbar combination is accomplished by reversing the sequence described above. Thus, in moving the row marker/toolbar combination from the retracted configuration to the extended configuration, cylinder rod 36a is first retracted so as to lower the first toolbar section 76 to a generally horizontal orientation, followed by retraction of cylinder rod 24a causing the lowering and extension of the row marker 10.

There has thus been shown a folding row marker which includes pivotally coupled first inner, second intermediate and third outer sections. A marker disc is disposed on the distal end of the third outer section. Pivoting mounting brackets couple adjacent ends of the first inner and second intermediate sections as well as adjacent ends of the second intermediate and third outer sections. The three sections are raised by means of the extension of a hydraulic ram and suitable linkage is provided for maintaining the three sections under the application of a positive force in a fixed configuration when retracted to the full folded position for transport or storage. The folding row marker is adapted for mounting to the end of an agricultural toolbar which, in turn, may be pivotally displaced in a generally vertical direction to permit movement of the toolbar/row marker combination between a folded, non-use position and an extended, use position.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit Tnd scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. For use with a tool bar, a folding row marker comprising:
   a first, inner section pivotally coupled to an end of a toolbar member and including an inner mounting bracket on a distal end thereof;
   a second, intermediate section pivotally coupled to a distal end of said first section by means of said inner mounting bracket;
   a third, outer section having a proximal end pivotally coupled to said second section and a distal end having a market element disposed thereon;
   displacement means coupled to said first and second sections for pivotally displacing in a generally vertical direction said first section relative to said toolbar member and said second section relative to said first section in folding and unfolding said row marker between non-use and use positions wherein said displacement means includes a hydraulic ram coupled to said inner mounting bracket for pivotally displacing said inner mounting bracket and said second section about the distal end of said first section; and
   control means coupled to said first and third sections for extending said third section from said second section generally horizontally when in the use position and for applying a positive force to said third section to maintain said third section in closely spaced, fixed relation with respect to said second section when in the non-use position.

2. The folding row marker of claim 1 wherein said hydraulic ram has a butt end coupled to the toolbar member and a rod end coupled to said inner mounting bracket.

3. The folding row marker of claim 2 wherein said inner mounting bracket includes an elongated slot to which the rod end of said hydraulic ram is coupled to allow for limited vertical displacement of said second and third sections relative to said first section when the row marker is in the extended use position to permit said marker element to follow ground contour.

4. The folding row marker of claim 1 wherein said control means includes a plurality of pivotally coupled links coupled to said first section and to a proximal end of said third section for pivotally displacing said third section in a first direction as said second section is pivotally displaced with respect to said first section in a second, opposed direction by said displacement means.

5. The folding row marker of claim 4 wherein said plurality of links includes a long control link for maintaining said third section under a positive force when fully folded to the retracted, non-use position.

6. The folding row marker of claim 5 wherein said plurality of links further includes a short control link and an idler link pivotally coupled to a distal end of said long control link.

7. The folding row marker of claim 6 wherein said third section includes an outer mounting bracket on the proximal end thereof for pivotally coupling said second and third sections.

8. The folding row marker of claim 7 wherein said short control link pivotally couples said long control link to said outer mounting bracket, whereby said third section is pivotally displaced relative to said second section in response to pivotal displacement of said second section relative to said first section.

9. The folding row marker of claim 8 wherein said idler link couples a distal end of said long control link to said second section in a sliding manner for maintaining relative positions of pivot points between said second and third sections and said plurality of pivotally coupled links during folding and unfolding of said third section.

10. The folding row marker of claim 9 wherein said third section further includes an upper link pivotally coupled to said outer mounting bracket and to said short control link for pivotally displacing said third section relative to said second section upon displacement of said second section.

11. The folding row marker of claim 10 wherein said third section further includes a lower link coupled to said upper link and having a distal end to which said marker element is attached.

12. The folding row marker of claim 11 further comprising stop means coupled to said third section for engaging said second section when the row marker is in the retracted, non-use position to prevent further folding of said third section and to provide fixed positioning of said third section relative to said second section when folded.

13. The folding row marker of claim 12 further comprising mounting bracket means for coupling a proximal end of said long control link to said first section.

14. The folding row marker of claim 13 wherein said mounting bracket means includes an elongated slot coupled to the proximal end of said long control link for permitting limited vertical displacement of said second and third sections relative to said first section when the row marker is in the extended use position to permit said marker element to follow ground contour.

15. The folding row marker of claim 14 wherein said toolbar includes a plurality of pivotally coupled members foldable between an extended use position and a retracted non-use position and wherein said first section is pivotally coupled to a distal end of one of said pivotally coupled toolbar members.

16. A row marker attached to an end of a toolbar member for providing an indication of proper lateral positioning of said toolbar relative to rows of crops, said row marker comprising:
- a first inner section pivotally coupled to an end of the toolbar and including an inner mounting bracket on a distal end thereof;
- a second intermediate section pivotally coupled to said first section by means of said inner mounting bracket;
- a third outer section pivotally coupled to said second section and having a marker element on a distal end thereof;
- displacement means including a hydraulic ram coupled to the toolbar member and to said inner mounting bracket for pivotally moving said first and second sections between an extended, use position and a folded, non-use position; and
- linkage coupling said first, second and third sections for allowing said marker element to follow ground contour when the row marker is in the extended, use position and for pivotally displacing and maintaining said third section under a positive force in a tightly folded position relative to said second section when the row marker is in the folded, non-use position.

* * * * *